United States Patent
Janhonen et al.

(10) Patent No.: US 6,345,181 B1
(45) Date of Patent: Feb. 5, 2002

(54) CHARGING CRITERIA FOR A CALL IN A CELLULAR MOBILE NETWORK

(75) Inventors: Risto Janhonen, Kirkkonummi; Markku Tuohino; Veli Turkulainen, both of Helsinki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,830

(22) PCT Filed: Jun. 3, 1997

(86) PCT No.: PCT/FI97/00346

§ 371 Date: Dec. 3, 1998

§ 102(e) Date: Dec. 3, 1998

(87) PCT Pub. No.: WO97/48245

PCT Pub. Date: Dec. 18, 1997

(30) Foreign Application Priority Data

Jun. 7, 1996 (FI) .................................................. 962380

(51) Int. Cl.⁷ .............................................. H04M 11/00
(52) U.S. Cl. ..................... 455/406; 455/432; 455/436; 455/408
(58) Field of Search ................................ 455/406, 461, 455/560, 405, 408, 432, 433, 436, 443

(56) References Cited

U.S. PATENT DOCUMENTS

| | | | |
|---|---|---|---|
| 5,260,987 A | | 11/1993 | Mauger |
| 5,295,180 A | | 3/1994 | Vendetti et al. |
| 5,457,810 A | * | 10/1995 | Ivanov et al. ............... 455/441 |
| 5,526,400 A | * | 6/1996 | Nguyen ...................... 455/432 |
| 5,568,153 A | * | 10/1996 | Beliveau ..................... 455/433 |
| 5,579,379 A | * | 11/1996 | D'amico et al. ............ 379/112 |
| 5,592,535 A | * | 1/1997 | Klotz ........................ 455/466 |
| 6,018,652 A | * | 1/2000 | Frager et al. ............... 455/406 |

FOREIGN PATENT DOCUMENTS

| EP | 0 597 638 | 5/1994 |
|---|---|---|
| WO | WO 96/20570 | 7/1996 |
| WO | WO 96/20571 | 7/1996 |

* cited by examiner

*Primary Examiner*—Dwayne Bost
*Assistant Examiner*—Lewis G. West
(74) *Attorney, Agent, or Firm*—Altera Law Group, LLC

(57) ABSTRACT

If the location cell of a calling subscriber or a called subscriber belongs to a set of special cells at the beginning of a call, a cheaper tariff is applied. According to the invention, the charging criterion is updated in the beginning and during the call. If a subscriber roams from the area of a public network cell to the set of special cells, the cell information propagates to the MSC of the called subscriber. The MSC and/or service control point compares this cell information with the set of special cells and determines that the new cell of the called subscriber belongs to the special cells, due to which the tariff can be changed. Information on the called subscriber's changed cell type is transmitted to the mobile switching centre of the calling subscriber.

13 Claims, 1 Drawing Sheet

CHARGING CRITERIA FOR A CALL IN A CELLULAR MOBILE NETWORK

BACKGROUND OF THE INVENTION

The invention relates to a method of improving charging criteria for a call in a cellular mobile network according to the preamble of claim 1. The invention further relates to a mobile system implementing such a method.

EP application 0 597 638 discloses a cellular telephone system wherein the charging tariff applicable to each mobile telephone depends on the area in which it is located. Each base station broadcasts an identifying signal on its control channel. Each mobile telephone responds by displaying to the user in identification of the cell or corresponding area.

The solution disclosed in said '638 application suffers from several disadvantages. One major disadvantage is that it requires modifications to each of the mobile telephones. Another disadvantage is a possibility for misuse of the system. Such a situation may arise e.g. when the subscriber starts a call from a special cell entitled to a more advantageous tariff and moves away from that cell during the call. Alternatively, the subscriber may move during the call from a public cell to a special cell, in which case he would be entitled to a cheaper tariff. This does not happen, however, because the call was not established in a special cell.

BRIEF SUMMARY OF THE INVENTION

Accordingly, it is an object of the invention to develop a method and an equipment for implementing the method in such a way that said moving of a subscriber during a call can be taken into consideration in a way which is fair both to providers and users of communications services. The method and the equipment for implementing it should not require modifications to the mobile telephones. The objects of the invention are achieved by methods and systems which are characterized in what is set forth in the independent claims. The object of the dependent claims is constituted by preferred embodiments of the invention.

The invention is based on the use of intelligent network (IN) techniques. An example of such an intelligent networks is described in recommendations Q.1200–Q.1219 of ITU-T. A service control point SCP of an intelligent network is provided with a charging criterion service, i.e. the determination of charging criteria is extended in such a way that a number of mobile network cells is chosen as a group of special cells. If the location cell of a calling subscriber A (MS-A) or the called subscriber B (MS-B) belongs to such a group of special cells, a cheaper tariff is applied to the call. Also, the invention is based on monitoring during a call, for instance in connection with a handover, whether the new cell of the subscriber belongs to the group of special cells entitled to a more advantageous tariff.

An advantage of the method and the system according to the invention is that the price formation of a call is fair and real-time both for the mobile subscriber and the network operator. An implementation of the invention does not require any changes in existing hardware Especially, implementing the invention requires no modification to the mobile telephones. Instead, all modifications can be concentrated within the fixed part of the network, e.g. by a change in the software of a service control point of a mobile switching centre and/or an intelligent network.

BRIEF DESCRIPTION OF THE SEVERAL VIEWS OF THE DRAWING

The invention will now be described in greater detail by means of preferred embodiments with reference to the attached drawings, in which.

DETAILED DESCRIPTION OF THE INVENTION

Indications as follows are used in the figures. Mobile Switching Centres MSC1 and MSC2 are centres serving a calling subscriber and a called subscriber, respectively, and comprising Service Switching Points SSP1 and SSP2 of an intelligent network. SCP1 and SCP2, respectively, are Service Control Points relating to MSC1 and MSC2. A Public Cell CP is a cell of a public switched telephone network and a Special Cell CS is a cell to which is applied a special tariff. The calling subscriber MS-A and the called subscriber MS-B are mobile subscribers. At least one of these subscribers can be a subscriber of a Private Branch eXchange PBX as well, in which case a default value cell is defined for at least part of the exchanges PBX and, additionally, a special charging criterion is applied in the method to calls during which the subscriber of the exchange network is within the area of the default value cell.

To illustrate the invention, but without restricting it in any way, a case is discussed in which a change in charging criterion is started by a change of location of the called subscriber. The network operator may, of course, set other criteria as well. It is thus for the operator to decide, whether a special tariff is applied when the calling subscriber, the called subscriber, one of the subscribers or both subscribers are located in a special cell CS.

Figure 1:
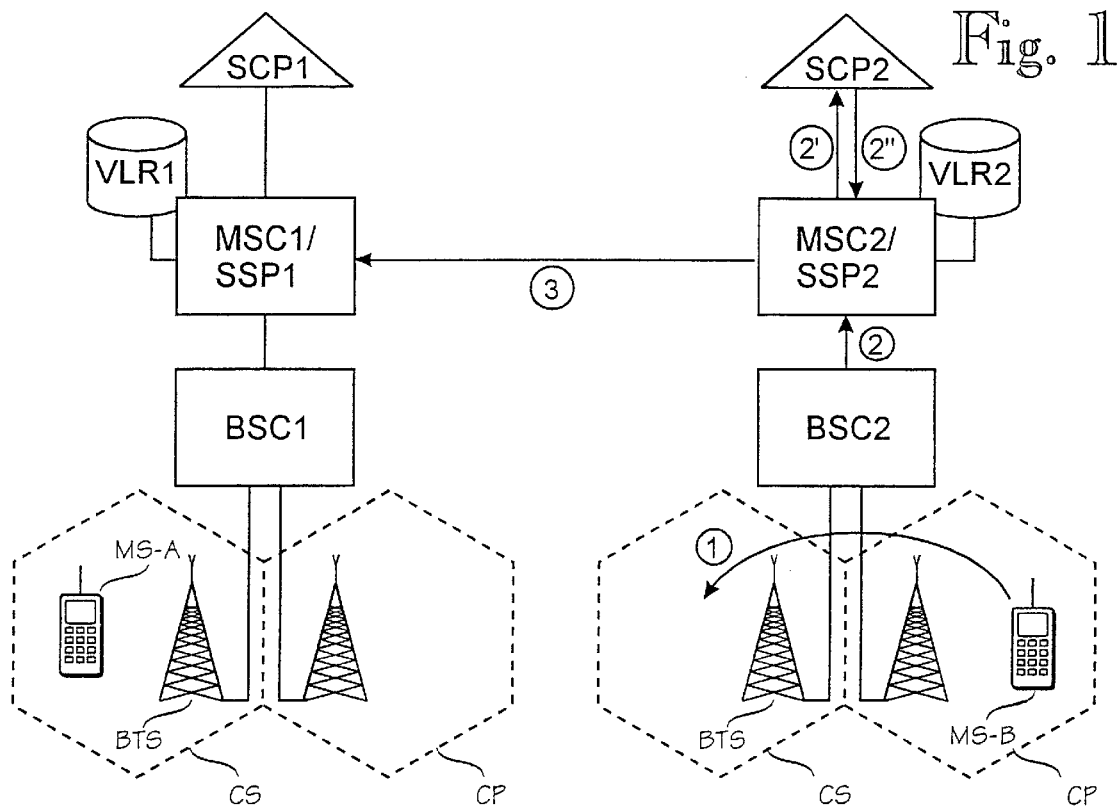
FIG. 1 shows mobile network parts essential for the invention.

FIG. 1 shows a case to which is applied the charging criterion according to the invention. The starting point of a call can be e.g. a PNP call which means that the calling subscriber and the called subscriber belong to the same enterprise or group of users which uses the same numbering plan (PNP, Private Numbering Plan). At the beginning of the call, the called subscriber is located in a public network cell CP. The location information on the called subscriber has been transmitted to the mobile switching centre MSC1 of the calling subscriber and it may have been used as a parameter for charging determination.

It is assumed that the called subscriber roams during the call from the public network area to a set of special cells CS (stage 1). At a handover, the cell information moves to the mobile switching centre MSC2 serving the called subscriber (stage 2). The mobile system (mobile switching centre MSC and/or service control point SCP) compares this cell information with the set of special cells CS and determines that the new cell of the called subscriber belongs to this set of special cells. Processing cell information may take place in different ways:

In one embodiment of the invention, information regarding the special cells CS relating to the called subscriber within the areas of different mobile switching centres are stored at the service control point SCP. In another embodiment of the invention, the centre MSC2 of the called subscriber and especially a related Visitor Location Register VLR obtain information on the special cells CS of the called subscriber from the service control point SCP2 at location updating. This function requires that the location updating can trigger an intelligent network service, in which the parameters of the called subscriber together with the information on the special cells are updated to correspond to the situation of this MSC/VLR.

Subsequently, the MSC2/SCP2 of the called subscriber can analyse a change in the called subscriber's cell information (stages 2'–2") and transmit information on that to the switching centre MSC1 of the calling subscriber scriber or to the service control point SCP1 (stage 3). This information may be e.g. a change in cell information from the public network cell CP to the set of special cells CS or the opposite. The MSC2/SCP2 of the called subscriber does not inform the MSC1 of the calling subscriber or the service control point SCP1 of the change in the cell information until the change is significant for the charging criteria. To avoid unnecessary signalling, it is preferable to estimate the permanence of the change, e.g. by using a short time hysteresis, before the change in the cell information is transmitted to the MSC1/SCP1 of the calling subscriber. A suitable length of time hysteresis is for instance approximately 10 seconds.

The mobile system sends the location information on the called subscriber to the MSC1/SCP1 of the calling subscriber, e.g. "cell information changed to the set of special cells". This information can be used in real time e.g. for the control of charging information visible on the phone.

Next, it will be described how the mobile communication system can transmit the location information on the called subscriber to the MSC/SCP of the calling subscriber. Alternative implementations are based on the functionality of the intelligent network and on combining that and e.g. the PLMN of the GSM system. The intelligent network can locally complement the functionality of the mobile switching centre MSC.

A change of cell information during a handover can be used for real-time updating of charging criteria in MSC/SCP. In cell-based charging, the price of a call is thus based on actual cell information. The mobile communication system monitors this cell information and compares it with the special cells defined to the subscriber in question. When MSC/SCP observes at a handover that the cell of the called subscriber has changed from a common cell CP into a special cell CS or vice versa, the system changes the charging criterion to correspond to the changed situation.

In connection with a handover, a Base Station Controller BSC gives the switching centre MSC a Handover_Performed message. The message includes a Cell Identifier CI.

Still referring to FIG. 1, cell information is transmitted according to the first alternative by utilizing inter-exchange signalling. The processing of the cell information takes place locally e.g. based on the functionality of the intelligent network. During a call, MSC2 receives, as a result of an internal handover of a base station (i.e. in a Handover_Performed message), the identifier CI of the new cell of the called subscriber. A change related to that has been made in the switching centre MSC and, to be more exact, in its Basic Call State Model BCSM, due to which change a request for an intelligent network service can be made after the handover. When starting the service, the service control point SCP has set a triggering condition for the event (Event Detection Point EDP) "O_handover".

After MSC2 has received the information on the handover (stage 2), it sends an information on that to SCP2 (stage 2'). Alternatively, MSC2 may have a triggering condition for starting this function, in which case MSC2 informs SCP2 of the cell and the subscriber. SCP2 answers MSC2 with cell type. During call establishment, SCP2 has examined whether the original cell of the called subscriber belongs to the group of special cells. According to the invention, SCP2 performs the same examination during the call, at the handover. It is assumed that this has taken place. In this case SCP2 informs MSC2 that the cell type has changed from a public network cell into a special cell (stage 2"). MSC2 sends an information on the change of the cell type backwards to MSC1 by using inter-exchange signalling (stage 3).

Additionally, it is preferable to restrict the inquiries to SCP concerning the called subscriber in such a way that an inquiry takes place only when the called subscriber is a subscriber, such as a PNP or VPN subscriber or the like, to which special cells are defined. Another alternative way is to utilize location updating. This will be described in the following.

As far as the load on the intelligent network is concerned, it is preferable to implement a solution as follows: when the mobile stations MS-A and MS-B perform location updatings in a location area where their special cells are located, information on special cells in a new location area to which a special tariff is applied is updated from SCP to VLR at the location updating. Consequently, the information on said subscriber having special cells within a location area is stored in VLR as per location. This technique is called "dynamic location updating". By this technique, unnecessary inquiries to the SCP of the intelligent network are avoided by the call control monitoring before triggering, as a triggering condition, whether special cells can be related to said call in said location area. An inquiry to SCP is made only if the triggering condition is fulfilled.

It shall be noted that an ISDN signalling ISUP according to the prior art (CCITT specifications Q.721 to Q.725) does not support transmitting cell information backwards, due to which a non-standard, i.e. manufacturer-specific, definition of an ISUP charging message is required for the transmission of this information. Such a manufacturer-specific definition has been discussed in the same applicant's Finnish Patent Application 946091 and there especially in connection with the description relating to FIG. 2 and in the Finnish Patent Application 946092 and there especially in connection with FIG. 3.

Cell information may consist of a mere changed cell or it may include a result, analysed by SCP2, of whether the called subscriber's new cell belongs to the group of special cells. When MSC1 receives this information, it may ask SCP1 to analyse the cell information, if SCP2 has not made it already.

According to a second alternative described in FIG. 2, the cell information is transmitted much in the same way as according to the first alternative described in connection with FIG. 2. In this alternative, MSC2/SSP2 sends the cell information by utilizing INAP protocol directly to SCP1 (stage 3). MSC2/SSP2 acts as a so-called Assisting/Hand-Off SSP. The INAP protocol has been described in the document prETS300 374-1,1 Intelligent Network (IN): Intelligent Network Capability Set 1 (CS1), Core Intelligent Network Application Protocol (INAP), Part 1, Protocol Specification. MSC2 has received the address of SCP1 and an identifier of a program responsible for the service in an Initial Address Message IAM, for instance. As to the rest, the second alternative agrees with the first one.

Figure 3:
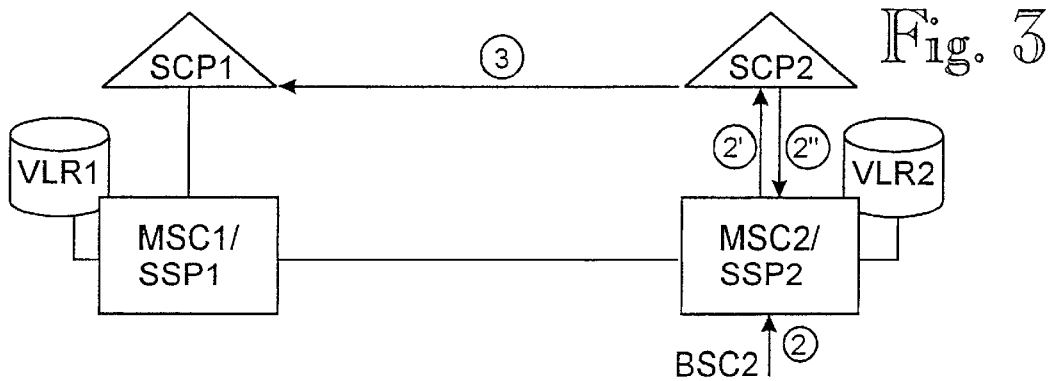

According to a third alternative described in FIG. 3, there is a direct signalling connection between SCP1 and SCP2. The INAP protocol does not support this at the moment. Alternatively, also Mobile Application Part (MAP) signalling can be used, in which is made a change to support the transmission of the cell information. In this alternative, SCP2 informs SCP1 directly of the called subscriber's location. After having received a response message, MSC1 sends a request for charging information to SCP1 (stage 3).

Figure 2:
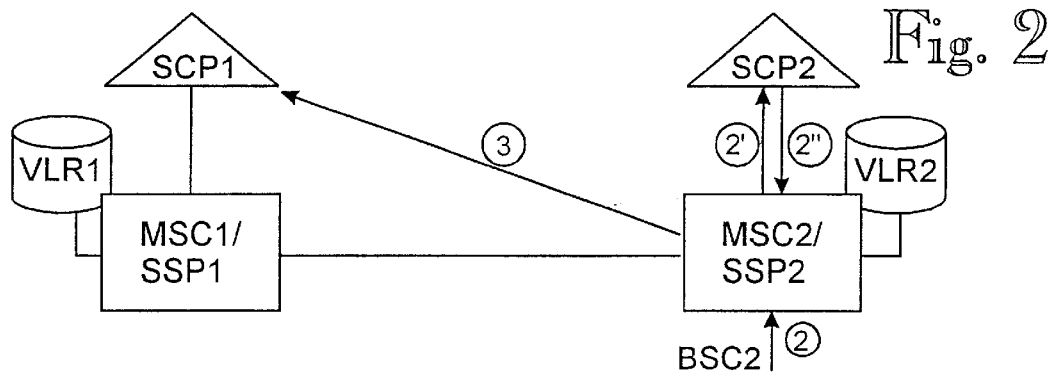
FIGS. 2 and 3 show alternative manners of transmitting cell information on a called subscriber to a charging criterion service attending to charging a calling subscriber.

In the FIGS. 1 to 3, it is assumed that the service control points SCP1 and SCP2 comprise data bases SDP1 and SDP2, respectively, which are not shown separately in the figures. Alternatively, the service control points SCP1 and SCP2 can be connected to one common data base. The same service control point SCP1 or SCP2 may naturally serve also two or more mobile switching centres MSC1–MSC2. For the invention, the architecture of the intelligent network is not essential.

The invention has been described by way of example in connection with a GSM system or its derivatives. On the basis of the above description, it is easy for one skilled in the art to apply the invention also to other mobile systems. Accordingly, the invention and its embodiments are not restricted to the above examples, but they can be modified within the scope of the claims.

What is claimed is:

1. A method of improving charging criteria for a call between a calling subscriber and a called subscriber in a cellular mobile network, in which a mobile switching center comprises a service switching point of an intelligent network, the service switching point providing a subscriber with an access to services of a service control point, wherein at least one cell of the mobile network constitutes a set of special cells entitled to a more advantageous tariff;

the method comprising the steps of:
    providing the service control point with a charging criterion service applying a special charging criterion defined for the set of special cells;
    monitoring, during the call, in respect of both the calling and the called subscriber, whether either subscriber's cell belongs to the set of special cells entitled to the more advantageous tariff; and
    the service control point applying the special charging criterion defined for the set of special cells, if the cell of at least one subscriber belongs to the set of special cells.

2. A method according to claim 1, wherein said monitoring step is performed in connection with a handover to another cell.

3. A method according to claim 1 wherein information on the special cells is stored at the service control point.

4. A method according to claim 1, wherein the mobile switching centre serving at least one subscriber and/or a related visitor location register receives, at a location area update procedure, information on that at least one subscriber has special cells within said location area.

5. A method according to claim 4, wherein the mobile switching centre serving and/or the related visitor location register receives said information from the service control point.

6. A method according to claim 1 wherein information on the called subscriber's cell change is transmitted from the mobile switching centre serving the called subscriber to the mobile switching centre serving the calling subscriber.

7. A method according to claim 1, wherein information on the called subscriber's location cell change is transmitted from the intelligent network service switching point serving the called subscriber to the service control point serving the calling subscriber.

8. A method according to claim 1, wherein information on the called subscriber's location cell change is transmitted from the intelligent network service control point serving the called subscriber to the service control point serving the calling subscriber.

9. A method according to claim 1, wherein that the service control point of the intelligent network is asked for information on the called subscriber's location cell only if the called subscriber is a subscriber to which are allocated special cells.

10. A method according to claim 1, further comprising defining a default value cell for at least one private branch exchange in an exchange network, and applying the special charging criterion if a subscriber of the exchange network is located within the area of the default value cell.

11. A method according to claim 1, further comprising using a time hysteresis to determine that the change in cell information is permanent before beginning or ceasing to apply the special charging criterion.

12. A method according to claim 1, further comprising transmitting information to the calling subscriber's mobile station if the call begins or ceases to be entitled to the more advantageous tariff.

13. A mobile communication system comprising:
    at least two cells, at least one of the cells constituting a set of special cells;
    a mobile switching centre and a related service switching point of an intelligent network;
    a service control point of an intelligent network, the service control point comprising a charging criterion service applying a special charging criterion defined for the set of special cells; and
    means for monitoring, during the call, in respect of both the calling and the called subscriber whether the subscriber's cell belongs to the set of special cells entitled to the more advantageous tariff;
    wherein the service control point is adapted to apply the special charging criterion defined for the set of special cells if the cell of at least one subscriber belongs to the set of special cells.

* * * * *